United States Patent [19]

Turk

[11] Patent Number: 4,929,664
[45] Date of Patent: May 29, 1990

[54] CROSSLINKABLE SILICONE POLYMERS WITH TALC REINFORCING AGENTS HAVING IMPROVED NON-SAG AND MODULUS PROPERTIES

[75] Inventor: Herbert M. Turk, Willoughby, Ohio

[73] Assignee: The B.F. Goodrich Company, Akron, Ohio

[21] Appl. No.: 286,099

[22] Filed: Dec. 19, 1988

[51] Int. Cl.$^5$ ............................................... C08K 3/34
[52] U.S. Cl. .................................... 524/451; 524/789
[58] Field of Search ............................... 524/451, 789

[56] References Cited

U.S. PATENT DOCUMENTS

| | | | |
|---|---|---|---|
| 4,131,589 | 12/1978 | Smith, Jr. | 524/789 |
| 4,173,551 | 11/1979 | Crivello | 528/19 |
| 4,587,288 | 5/1986 | Maxson et al. | 524/789 |

*Primary Examiner*—Melvyn I. Marquis
*Attorney, Agent, or Firm*—James R. Lindsay; Konrad H. Kaeding; Daniel J. Hudak

[57] ABSTRACT

A talc reinforcing agent is presented for use with a crosslinkable silicone polymer system which has improved sag and modulus properties. The talc reinforcing agent can be used in one and two-part silicone sealant systems. The reinforcing agent results in improved non-sag characteristics without the use of fumed silica.

8 Claims, No Drawings

CROSSLINKABLE SILICONE POLYMERS WITH TALC REINFORCING AGENTS HAVING IMPROVED NON-SAG AND MODULUS PROPERTIES

FIELD OF THE INVENTION

The present invention relates to talc reinforcing agents for use in crosslinkable silicone sealant systems. The reinforcing agents result in improved non-sag characteristics while eliminating the need to use fumed silica in the system. The reinforcing agents further improve the modulus of the system.

BACKGROUND ART

Heretofore it has been known to use calcium carbonate as a bulkifying agent or filler in one and two-part silicone sealant systems. It is necessary in this case to add fumed silica to the system in order to achieve satisfactory sag characteristics of the system. However, the fumed silica may react with the silicone polymer, and further, may contribute significantly to the cost of the final product. In the present invention, talc is used as a replacement for calcium carbonate and fumed silica. The talc reinforcing agent achieves the desired non-sag characteristic and further results in improvement in the modulus of the sealant system.

SUMMARY OF THE INVENTION

It is therefore an aspect of the present invention to provide a reinforcing agent which eliminates the need for fumed silica and which gives the desired non-sag characteristic to the silicone sealant. The reinforcing agent of the present invention results in a sag measurement as measured by the Boeing Jig test of 0.08 inches, or more preferably 0.02 inches. It is a further advantage of the reinforcing agents of the present invention to increase the modulus of the silicone system. The reinforcing agents result in improvements of 25 and preferably 50 percent of the stress at 50 percent strain.

DETAILED DESCRIPTION OF THE INVENTION

The present invention relates to a reinforcing agent for producing a one-part or a two-part silicone sealant system. The reinforcing agent is a platy talc which achieves a sag of 0.08, and preferably 0.02 inches as measured by the Boeing Jig Test (full). The reinforcing agents further result in an improvement in the stress at 50 percent strain of 25 percent, and preferably 50 percent. The reinforcing agent is added in an amount of 50 to 150, and preferably 75 to 125 parts by weight per 100 parts polymer. The need for fumed silica is eliminated by the use of the reinforcing agent in accordance with the invention.

The reinforcing agents of the present invention can be used with a one-part or a two-part silicone system. The one-component silicone system consists of a silicone polymer of the general formula

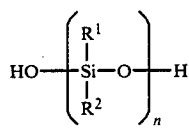

where the polymer is hydroxy terminated and $R^1$ and $R^2$, independently, are aliphatic or aromatic, and preferably alkyl $C_1$ to $C_6$, or aryl or alkyl aryl $C_6$ to $C_{12}$, and more preferably alkyl $C_1$ or $C_2$, or aryl or alkyl aryl $C_6$ to $C_8$. The integer n is a value such that the viscosity of the polymer should be from about 5,000 to about 500,000; and more preferably from about 18,000 to about 350,000 centistokes.

A crosslinking agent is used and is preferably a neutral crosslinking agent as is known in the art. Such crosslinking agents include oximes and alcohols, with oximes being preferred. The oximes have the general formula

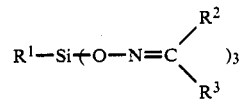

wherein $R^1$ is aliphatic, aryl, or alkylaryl having from 1 to 12 carbon atoms; and preferably alkyl having from 1 to 6, or aryl or alkylaryl having from 6 to 12 carbon atoms; and most preferably vinyl or vinyl containing alkyl having from 1 to 6 carbon atoms; and $R^2$ and $R^3$ are the same or different, and are alkyl having from 1 to 6 carbon atoms, with alkyl having 1 to 2 carbon atoms preferred. The crosslinking agent is preferably methyltris (methylethylketoximino)silane. The crosslinking agent is used in an amount from 5 to 25, and preferably 15 to 20 parts by weight per 100 parts polymer.

A non-reactive silicone fluid is added of the formula:

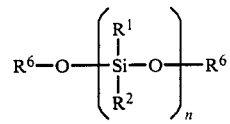

wherein $R^1$ and $R^2$ are defined as above, and $R^6$ is trialkyl substituted silyl, where each alkyl is individually alkyl $C_1$ to $C_6$, trimethylsilyl is preferred. The integer n is a value such that the viscosity of the fluid is from 50 to 20,000 centistokes, and preferably 100 to 2,000 centistokes. The fluid is added in an amount of 10 to 100; and preferably 20 to 80 parts by weight per 100 parts polymer.

An adhesion promoter is added. Such promoters are known in the art and include silanes, titanates, alumina zirconate, aminofunctional siloxane, and the like, and preferably aminofunctional siloxane. The promoter is added in an amount of 0.1 to 5, and preferably 0.5 to 4 parts by weight per 100 parts polymer.

A catalyst is added. Such catalysts are known in the art and include dialkyltin dicarboxylates, stannous octoate, titanates, amines, and the like. Preferred catalysts include dialkyltin dicarboxylates. The catalyst is used in an amount of from about 0.01 to 3 and preferably from about 0.02 to 1 part by weight per 100 parts polymer.

A two-component sealant system includes a polymer-based system and a curative system. The base comprises a silicone polymer of the same formula given before and having a viscosity of from about 500 to about 500,000 centistokes, and more preferably from about 500 to about 350,000 centistokes. In general, the polymer used in a two-component system preferably has a viscosity of about 20,000 centistokes. It is further possible to use a lower viscosity polymer, including one having a viscosity below 500 centistokes and omitting the non-reactive fluid. This would of course depend on the application of a sealant system.

A non-reactive fluid is used as defined above and may be from about 0 to about 40, and preferably 0 to 20 parts by weight per 100 parts polymer.

The base could optionally include antisettling agents, and coloring agents as are known in the art. The talc reinforcing agent could be added to the base, the curative, or both.

The two-component system further includes a curative system having a curative such as ethylorthosilicate, ethylpolysilicate, acetoxysilicate, aminosiloxane, or oximinosilanes, in an amount sufficient to react with the polymer in the system. An adhesion promoter is added to the curative system and may include those adhesion promoters noted earlier, and preferably is aminofunctional silane. An adhesion promoter is used in an amount of from about 0.1 to about 5, and more preferably 0.5 to about 4 parts by weight per 100 parts polymer. Carbon black paste can be added to the curative so that the base and the cure will have different colors in order that thorough mixing is facilitated. The carbon black is in an amount from 0 to about 10 parts, and preferably from about 3 to about 8 parts by weight per 100 parts polymer. Optionally the curative may include non-reacting fluids, catalysts, talc (or filler). The reinforcing agents of the present invention may be added to the curative system or the base, or both, in a two-component system. It is customary to add filler to the curative to bulk out the curative to bring the volume to the appropriate proportion. The curative is generally added in a ratio of from 8 to 14 parts of base per one part curative. It is critical to add a sufficient amount of curative to get a quick snap time for the two-component system.

The reinforcing agent of the present invention may be added to the one-component or the two-component system. The reinforcing agent is a talc, notably a platy talc. The platy talc of the present invention achieves a sag of 0.08 or less, and preferably 0.02 inches or less, as measured by the Boeing Jig Test (full). The talc further achieves improvements in stress at 50 percent strain of at least 25, and preferably at least 50 percent as measured by ASTM D-412, die C. The talc used as the reinforcing agent has a mean particle size of less than 3 $\mu$m, and preferably from about 0.5 to about 3 $\mu$m, and most preferably from about 1 to about 2 $\mu$m. The talc should have a surface area of from about 10 to about 30 meter square per gram, and preferably from about 15 to about 17 meter square per gram as measured by BET, $N_2$. The reinforcing agent is added in an amount from about 50 to about 150; and preferably from about 75 to about 125 parts by weight per 100 parts polymer. A preferred platy talc is Mistron Monomix sold by Cyprus Industrial Minerals Company.

EXAMPLE 1

The following recipes were mixed together by hand in a pint can:

|  | A | B | C | D | E |
|---|---|---|---|---|---|
| Silicone Polymer | 102 | 102 | 102 | 102 | 102 |
| BLR-3 | 40 + 40 | | | | |
| Dolocron 32-15 | | 40 + 40 | | | |
| Mistron | | | 40 + 40 | | |

| -continued | | | | | |
|---|---|---|---|---|---|
|  | A | B | C | D | E |
| Mist | | | | | |
| Ecca-Tex 10R (kaolin china clay) | | | | 40 + 40 | |
| Mistron Monomix | | | | | 40 + 40 |

The silicone polymer was a hydroxy terminated polydimethyl siloxane polymer of about 80,000 centistoke viscosity.

About 40 grams of the filler reinforcing agent was added to the polymer with the ingredients mixed by hand, and the viscosity was checked by appearance of the mixture. A further 40 grams of filler was added, and appearance was checked again.

TABLE I

| | APPEARANCE | | | | |
|---|---|---|---|---|---|
| | SAMPLES | | | | |
| FILLER | A | B | C | D | E |
| 40 Grams | Fluid Shiny | Fluid Shiny | Fluid Shiny | Poor Dispersion Stiff | Viscous Some non-sag |
| 80 Grams | Fluid Shiny | Fluid Shiny | Fair-Good Non-Sag Matte Finish | Still poor dispersion (pearls don't break up) | Very Viscous Excellent Non-Sag |

The fillers are generally described as follows: BLR-3 is a trademark for surface treated calcium carbonate sold by Pleuss-Stauffer, Inc; Dolocron 32-15 is a trademark for magnesium calcium carbonate dolomite, sold by Pfizer, Inc.; Mistron Mist is a trademark for a platy talc having a surface area of $16 \pm 1$ m$^2$/g (N$_2$Bet) sold by Cyprus Industrial Minerals Company; Ecca Tex 10R is a trademark for a kaolin china clay bead sold by ECC America, Inc.; and Mistron Monomix is a trademark for a platy talc having a surface area of $16 \pm 1$ m$^2$g, (N$_2$Bet), also sold by Cyprus Industrial Minerals Company.

This test shows that the platy talc, Mistron Mist, and Mistron Monomix result in an improved non-sag property as compared to the sample including calcium carbonate without fumed silica.

EXAMPLE 2

A compound was made using the same silicone polymer as used in Example I and using comparable ratios of filler. The polymer was compounded using an oxime crosslinker, an adhesion promoter, and a tin catalyst. Samples A and B, the two carbonate samples, were compounded using fumed silica while samples C and D did not have the silica. Sample A, the control, contained calcium carbonate and fumed silica.

Sample B was made replacing calcium carbonate with magnesium calcium carbonate dolomite, (Dolocron 32-15). Sample C was made replacing calcium carbonate and fumed silica with platy talc particles having an average particle size of 3.4 micrometers, Mistron Mist. Sample D was made replacing calcium carbonate and fumed silica with platy talc particles having an average particle size of 1.5 micrometers.

The flow characteristics as measured by the flow meter, ASTM No. D2452 with air pressure of 60 psig; values given are number of seconds to extrude 20 grams, and full Boeing Jig Test ASTM No. D2202, with the spacer removed so that the sealant plug is pushed completely out of the cavity, are set forth in the table below for each of the samples.

Strain, stress at 50 percent strain, stress at 100 percent strain, tensile strength, and elongation were determined by ASTM Test Method D-412, using die C. Tear Strength was determined according to ASTM D-624, die C. Sealant hardness was determined by ASTM C-661 (Shore A). Similar aging tests were performed with aging for four weeks at 120° F., 6 months at room temperature, and six months at 120° F. The results of these tests are set forth in Tables II and III.

TABLE II

| Material | Aging, Time @ Temp | DATA: Flow-meter 60 psi, 104" Sec/20 g | Boeing Jig, Full Inches | Skin Over Time | Tack Free Time |
|---|---|---|---|---|---|
| Filler | Initial | 14.0 | .06 | 23 | 75 |

TABLE II-continued

| Material | Aging, Time @ Temp | DATA: Flow-meter 60 psi, 104" Sec/20 g | Boeing Jig, Full Inches | Skin Over Time | Tack Free Time |
|---|---|---|---|---|---|
| Control With Silica | 4 wks 120° F. | 13.7 | .05 | 22 | 76 |
| | 6 mo. RT | 12.8 | .05 | 14 | 33 |
| | 6 mo. 120° F. | 11.4 | .05 | 21 | 74 |
| Dolocron 32-15 | Initial | 14.4 | .05 | 21 | 65 |
| | 4 wks 120° F. | 14.3 | .05 | 25 | 60 |
| | 6 mos. RT | 13.7 | .05 | 14 | 29 |
| | 6 mo. 120° F. | 13.0 | .04 | 16 | 32 |
| Mistron Mist | Initial | 24.5 | .19 | 70 | Over 120 |
| | 4 wks 120° F. | 23.9 | .30 | 70 | 215 |
| | 6 mo. RT | 24.8 | .39 | 43 | 102 |
| | 6 mo. 120° F. | 261.2 | .39 | 17 | 102 |
| Mistron Monomix | Initial | 30.8 | .04 | 25 | 85 |
| | 4 wks 120° F. | 35.6 | .07 | 32 | 90 |
| | 6 mo. RT | 30.1 | .09 | 16 | 34 |
| | 6 mo. 120° F. | 64.4 | .06 | 28 | 83 |

TABLE III
CURE STABILITY OF FILLER MODIFICATIONS

| Sealant | Aging | | Stress @ 50% Strain | Stress @ 100% Strain | Stress @ 150% Strain | Max. Stress | Elongation | Tear in pli | Shore A |
|---|---|---|---|---|---|---|---|---|---|
| Filler Control | Initial | | | | | | | | |
| | | Mean: | 25.08 | 40.94 | 51.32 | 149.27 | 745.0 | 29.35 | 23 |
| | | Std Dev: | .51 | 1.40 | 1.02 | 3.28 | 12.25 | .57 | |
| | 120° F. 4 wk | | | | | | | | |
| | | Mean: | 23.70 | 37.99 | 48.05 | 128.24 | 705.0 | 26.46 | 24 |
| | | Std Dev: | 2.56 | .98 | .85 | 4.37 | 10.0 | .69 | |
| | RT 6 mo. | | | | | | | | |
| | | Mean: | 30.07 | 42.69 | 50.36 | 127.06 | 674.0 | 26.84 | 20 |
| | | Std Dev: | 1.11 | .65 | .78 | 4.77 | 29.66 | .67 | |
| | 120° F. 6 mo. | | | | | | | | |
| | | Mean: | 25.54 | 39.45 | 49.55 | 123.89 | 694.0 | 27.19 | 19 |
| | | Std Dev: | .54 | .70 | .42 | 3.85 | 16.36 | .41 | |
| Dolocron 32-15 | Initial | | | | | | | | |
| | | Mean: | 26.95 | 53.10 | 75.85 | 159.18 | 508.0 | 31.19 | 28 |
| | | Std Dev: | 1.99 | 1.78 | 1.97 | 3.25 | 38.34 | .65 | |
| | 120° F. 4 wk | | | | | | | | |
| | | Mean: | 26.60 | 50.11 | 72.03 | 146.91 | 387.5 | 27.51 | 29 |
| | | Std Dev: | .77 | 1.10 | 2.55 | 2.10 | 9.57 | .65 | |
| | RT 65 mo. | | | | | | | | |
| | | Mean: | 34.91 | 57.32 | 80.02 | 143.14 | 410.0 | 29.97 | 24 |
| | | Std Dev: | .70 | 1.63 | 2.11 | 5.13 | 42.13 | .75 | |
| | 120° F. 6 mo. | | | | | | | | |
| | | Mean: | 30.96 | 52.46 | 74.31 | 142.68 | 403.0 | 28.45 | 23 |
| | | Std Dev: | 1.86 | 1.74 | 2.45 | 1.13 | 12.04 | .54 | |
| Mistron Mist | Initial | | | | | | | | |
| | | Mean: | 32.39 | 64.04 | 96.13 | 184.53 | 382.0 | 26.80 | 28 |
| | | Std Dev: | 1.53 | 2.48 | 3.03 | .87 | 23.08 | .78 | |
| | 120° F. 4 wk | | | | | | | | |
| | | Mean: | 29.45 | 58.45 | 89.08 | 157.28 | 275.0 | 24.94 | 27 |
| | | Std Dev: | 1.02 | .53 | 2.30 | 2.71 | 5.77 | .43 | |
| | RT 6 mo. | | | | | | | | |
| | | Mean: | 32.21 | 62.75 | 92.95 | 159.44 | 268.3 | 26.86 | 25 |
| | | Std Dev: | 1.10 | 1.77 | 4.49 | 6.49 | 19.41 | .43 | |
| | 120° F. 6 mo. | | | | | | | | |
| | | Mean: | 16.27 | 32.83 | 51.41 | 113.57 | 326.7 | 19.09 | 16 |
| | | Std Dev: | .89 | .96 | 1.44 | 3.82 | 18.89 | .45 | |
| Mistron Monomix | Initial | | | | | | | | |
| | | Mean: | 40.86 | 82.10 | 116.84 | 216.71 | 344.0 | 32.66 | 29 |
| | | Std Dev: | 2.24 | 1.79 | 3.00 | 5.20 | 14.75 | .69 | |
| | 120° F. 4 wk | | | | | | | | |
| | | Mean: | 37.95 | 73.78 | 108.03 | 168.32 | 230.0 | 28.89 | 31 |
| | | Std Dev: | 2.35 | 2.40 | 2.20 | 7.63 | 8.16 | .94 | |
| | RT 6 mo. | | | | | | | | |
| | | Mean: | 42.35 | 78.25 | 112.94 | 179.80 | 263.3 | 31.81 | 29 |
| | | Std Dev: | 2.35 | 3.05 | 3.87 | 3.02 | 12.11 | .70 | |
| | 120° F. 6 mo. | | | | | | | | |
| | | Mean: | 39.60 | 73.04 | 106.49 | 167.93 | 256.7 | 27.52 | 26 |

TABLE III-continued

| | | CURE STABILITY OF FILLER MODIFICATIONS | | | | | | |
|---|---|---|---|---|---|---|---|---|
| Sealant | Aging | Stress @ 50% Strain | Stress @ 100% Strain | Stress @ 150% Strain | Max. Stress | Elongation | Tear in pli | Shore A |
| | Std Dev: | 2.22 | 3.39 | 3.84 | 4.66 | 5.16 | 1.21 | |

The tests above show that the platy talc in accordance with the invention results in improvements in the modulus and in the sag characteristics and eliminates the need for fumed silica.

While in accordance with the Patent Statutes, the best mode and preferred embodiment has been set forth, the scope of the invention is not limited thereto, but rather by the scope of the attached claims.

What is claimed is:

1. A silicone sealant system comprising;
a silanol terminated silicone polymer of the formula

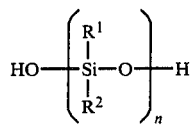

wherein $R^1$ and $R^2$, independently, are alkyl $C_1$ to $C_6$ or aryl or alkylaryl $C_6$ to $C_{12}$, wherein n is a value such that the viscosity of the polymer should be from 5,000 to 500,000 centistokes;
from about 5 to about 25 parts by weight per 100 parts polymer of a crosslinking agent or a curative;
from about 10 to about 100 parts by weight per 100 parts polymer of a non-reactive silicone fluid having a viscosity of 50 to 20,000 centistokes;
from about 0.1 to about 5 parts by weight per 100 parts polymer of an adhesion promoter;
from about 0 to about 3 parts by weight per 100 parts polymer of a catalyst;
and a reinforcing agent comprising a platy talc, said silicone sealant system having a sag of 0.08 inch or less as measured by he Boeing Jig Test without the use of a fumed silica and having a stress at 50 percent strain of at least 40 psi.

2. A silicone sealant system according to claim 1, wherein said platy talc comprises from about 50 to about 150 parts by weight per 100 parts polymer.

3. A silicone sealant system according to claim 2, wherein said platy talc comprises from about 75 to about 125 parts by weight per 100 parts polymer.

4. A silicone sealant system according to claim 3, wherein said platy talc has a surface area of from about 10 $m^2/g$ to about 30 $m^2/g$ and a median particle size of less than 3 $\mu$m.

5. A silicone sealant system according to claim 4, wherein said platy talc has a surface area of from about 15 to about 17 $m^2/g$ and a particle size of from about 0.5 to less than 3 $\mu$m.

6. A silicone sealant system according to claim 5, wherein said platy talc has a median particle size of from about 1 to about 2 $\mu$m.

7. A silicone sealant system according to claim 3, wherein $R^1$ and $R^2$, independently, is an alkyl $C_1$ to $C_6$ or aryl or alkylaryl $C_6$ to $C_8$.

8. A silicone sealant system according to claim 5, wherein $R^1$ and $R^2$, independently, is an alkyl $C_1$ to $C_6$ or aryl or alkylaryl $C_6$ to $C_8$.

* * * * *